United States Patent
Debleser

(10) Patent No.: US 6,504,260 B1
(45) Date of Patent: Jan. 7, 2003

US006504260B1

(54) WIND TURBINE WITH COUNTER ROTATING ROTORS

(75) Inventor: Yves Debleser, Enghien Belgique (BE)

(73) Assignee: Jeumont Industrie, Courbevoie (FR)

( * ) Notice: Subject to any disclaimer, the term of this patent is extended or adjusted under 35 U.S.C. 154(b) by 15 days.

(21) Appl. No.: 09/787,367

(22) PCT Filed: Jul. 19, 2000

(86) PCT No.: PCT/FR00/02077

§ 371 (c)(1),
(2), (4) Date: Mar. 16, 2001

(87) PCT Pub. No.: WO01/07784

PCT Pub. Date: Feb. 1, 2001

(30) Foreign Application Priority Data

Jul. 22, 1999 (FR) .............................. 99 09551

(51) Int. Cl.[7] ................................. F03D 9/00
(52) U.S. Cl. .......................... 290/44; 290/55
(58) Field of Search ............................. 290/43, 44, 54, 290/55

(56) References Cited

U.S. PATENT DOCUMENTS

| | | | |
|---|---|---|---|
| 3,740,565 A | 6/1973 | Wesley | 290/55 |
| 4,345,161 A | 8/1982 | Crompton | 290/55 |
| 5,315,159 A | 5/1994 | Gribnau | 290/55 |
| 5,506,453 A * | 4/1996 | McCombs | 290/44 |
| 6,127,739 A * | 10/2000 | Appa | 290/42 |
| 6,172,429 B1 * | 1/2001 | Russell | 290/4 R |
| 6,278,197 B1 * | 8/2001 | Appa | 290/54 |

FOREIGN PATENT DOCUMENTS

DE 38 44 505 7/1990

* cited by examiner

Primary Examiner—Nicholas Ponomarenko
(74) Attorney, Agent, or Firm—Connolly Bove Lodge & Hutz LLP

(57) ABSTRACT

A first capture unit includes a first turbine rotor having a first hub. A second capture unit includes a second turbine rotor having a second hub. The rotors counter-rotate independently. A first electric generator includes a first rotor fixed to the first turbine rotor and a first stator fixed so as to face the first rotor. A second electric generator includes a second rotor having a rotor fixed to the second turbine rotor and a second stator fixed so as to face the second rotor. Power electronic means control the electric currents produced by the first and the second stators of the first and the second electric generators independently of each other thus regulating the rotational speed of the first and second turbine rotors.

4 Claims, 4 Drawing Sheets

WIND TURBINE WITH COUNTER ROTATING ROTORS

FIELD OF THE INVENTION

The invention relates to a device for capturing wind energy in order to produce electrical energy.

BACKGROUND OF THE INVENTION

Devices for capturing the energy supplied by the wind, or wind turbines, comprising a vertical mast, a nacelle mounted so that it can rotate about a vertical axis on the upper part of the mast, and at least one capture unit carried by the nacelle, are known. The unit for capturing the wind energy comprises at least one turbine rotor consisting of a hub mounted so that it can rotate on the nacelle about an approximately horizontal axis and at least two blades (generally two or three blades) fixed to the hub in approximately radial directions.

The nacelle, which is generally streamlined, is oriented, automatically or by command, in such a way that the horizontal axis of rotation of the hub is directed into the wind and so that the turbine rotor is rotated at a certain speed which depends on the wind speed.

The energy recovered by the turbine rotor of the wind turbine can be used in different ways and, in particular, this energy can be converted into electrical energy which can be used locally at the site of the wind turbine or sent to a distribution grid.

In this case, the capture unit of the wind turbine also constitutes a unit for producing electrical energy and comprises an electric generator having at least one rotor secured to the turbine rotor and at least one stator fixed to the nacelle.

A first problem encountered in the case of units for capturing wind energy and producing electrical energy relates to the need to make the rotor the electric generator rotate at a sufficiently high speed, by rotation of the turbine rotor. To achieve that, it is generally necessary to use mechanical step-up gearing between the turbine rotor and the generator rotor. Such a device makes the wind turbine more complicated to construct and to maintain.

It has also been proposed for at least two turbine rotors mounted on one and the same axis and rotating in opposite directions to one another to be combined for driving the electric generator. In this case, it is necessary to provide means of mechanical connection between the two turbine rotors so as to drive and to regulate the rotational speed of the rotor of the electric generator.

Such mechanical connection devices are complex and considerably increase the size of the functional part of the wind turbine.

When two contra-rotating turbine rotors are used, a first turbine rotor is directed into the wind and the second turbine rotor, which follows on from the first turbine rotor in the direction of the wind, uses at least some of the recoverable energy of the wind which was not captured by the first turbine rotor.

The devices for mechanical connection between the turbine rotors do not generally allow the two turbine rotors to operate ideally, whatever the wind speed, that is to say do not allow operation such that the combined energy produced over a given period, for example over a year, is as close as possible to the maximum combined recoverable amount of energy.

In other words, there is not yet known any means that allows the operation of the first and of the second contra-rotating turbine rotors to be optimized according to the wind speed.

When the wind speed increases, above and beyond the wind turbine start-up speed, at a certain wind speed aerodynamic stall occurs or is brought about, providing some regulation of the operation of the wind turbine. It is necessary to provide mechanical means, for example devices for adjusting the pitch of the blades of the turbine rotors of the wind turbines, in order to stall or feather the turbine rotors, that is to say bring the blades into a position not subjected to the wind, under desired conditions. These mechanical devices are complex and may increase the risks of breakage and wear of the wind turbine in service.

Furthermore, the driving of the rotor or of the electric generators, off one or more turbine rotors, entails the use of mechanical means which increase the size of the capture units, particularly in the direction of the axis of rotation of the turbine rotors and of the generator rotors.

It is therefore preferable to provide a direct connection between the turbine rotor and the generator rotor. This type of drive cannot be used in the case of electric generators of current type. The use of make it possible to make an easier connection with the turbine rotor of the wind turbine and to increase the compactness of the capture unit of the wind turbine in the axial direction. However, such generators of the discoid type have never been used in wind turbines with contra-rotating turbine rotors.

BRIEF DESCRIPTION OF THE INVENTION

The object of the invention is therefore to provide a device for capturing wind energy to produce electrical energy, comprising a vertical mast, a nacelle mounted so that it can rotate about a vertical axis on the upper part of the mast and at least one capture unit comprising at least one turbine rotor consisting of a hub mounted so that it can rotate on the nacelle about an approximately horizontal axis and at least two blades fixed to the hub in approximately radial directions and an electric generator having at least one rotor connected to the turbine rotor such that it is driven in rotation by the turbine rotor and at least one stator fixed to the nacelle, it being possible for this device to be obtained compactly while at the same time exhibiting high installed power and making it possible to increase the amount of energy produced during a reference period, for example over the course of one year.

To this end, the capture device according to the invention comprises a first capture unit and a second capture unit, these respectively comprising a first and a second turbine rotor which contra-rotate and are arranged one on each side of the vertical axis of the mast, the hubs of which are mounted to rotate independently of one another about aligned axes and a first and a second electric generator produced in discoid shape and each comprising:
- at least one rotor having at least one disc-shaped part secured to the corresponding turbine rotor,
- at least one stator having at least one disc-shaped part facing the rotor, and
- power electronics means associated with the generator to allow the speed of the rotor to be regulated independently on each of the capture units.

The invention also relates to a method for regulating the capture device in order to optimize its operation so as to produce the maximum combined energy over a reference period.

In order to make the invention easy to understand, a device for capturing wind energy and for producing electrical energy according to the invention and its optimized use for producing a maximum combined amount of energy over a reference period will now be described by way of example with reference to the appended figures.

DETAILED DESCRIPTION OF THE INVENTION

Figure 1:
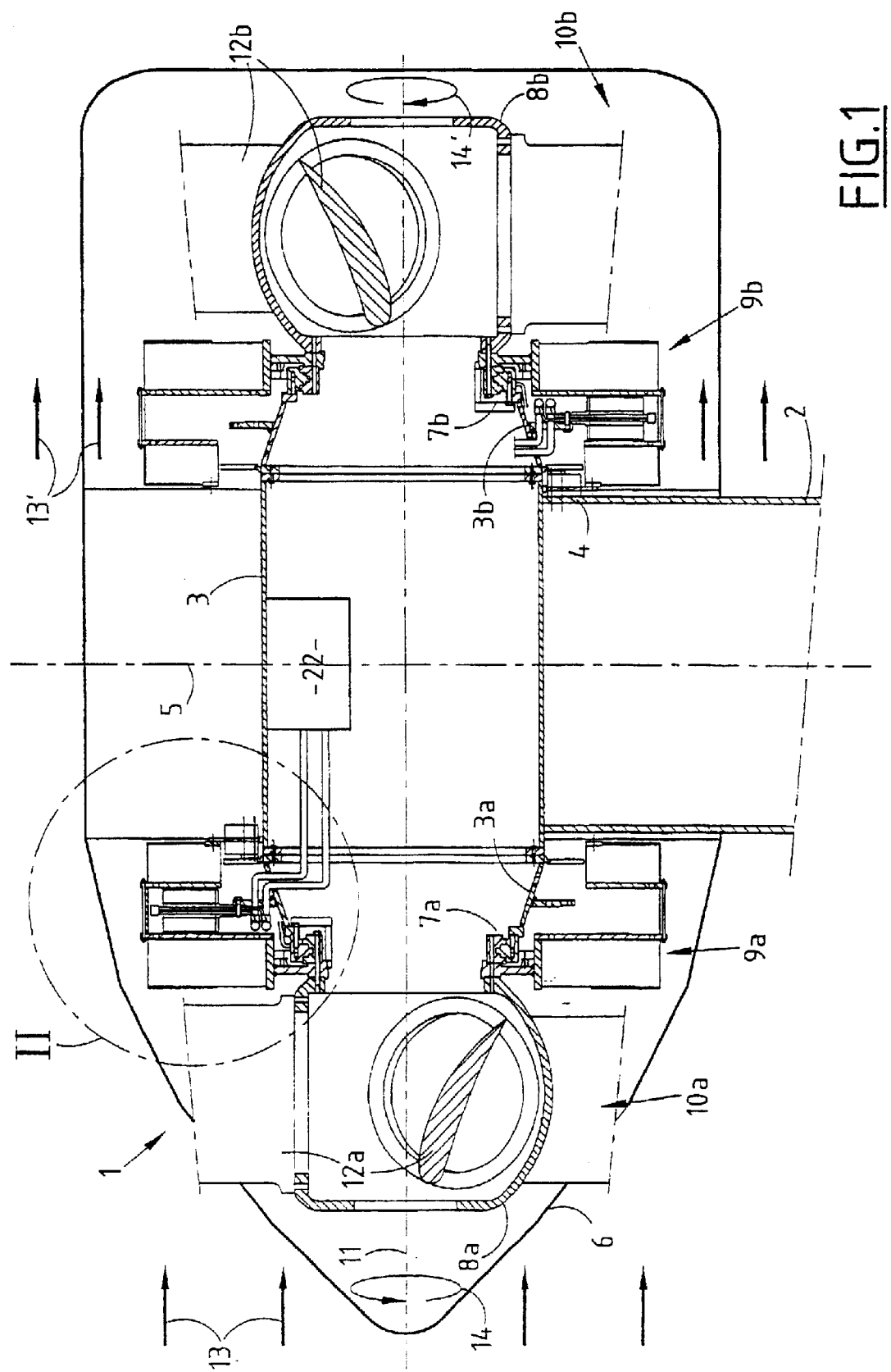
FIG. 1 is a view in axial section of the capture device according to the invention.

FIG. 1 shows a capture device according to the invention denoted overall by the reference 1.

FIG. 1 depicts only the upper part of the mast 2 of the capture device carrying the nacelle 3 at its upper end, via a bearing 4 which allows the nacelle 3 to be mounted such that it can rotate on the upper part of the mast 2 about the vertical axis 5.

The mast 2, only the upper part of which has been depicted in FIG. 1, may be very tall, for example of the order of 40 m high, the lower part of the mast being fixed into a solid footing in the ground at the wind energy production site.

A streamlined casing 6, of profiled shape, is fitted around the structure of the nacelle 3. The shape of the streamlining 6 is chosen, in particular, to meet requirements pertaining to the visual impact of the wind turbine.

On each side of the vertical axis 5 of the mast 2, about which it is mounted to rotate, the nacelle 3 has two extensions 3a and 3b, on each of which is mounted, respectively, via bearings 7a and 7b, a first hub 8a of a first turbine rotor 10a of the capture device and a second hub 8b of a second turbine rotor 10b.

The first turbine rotor 10a is for driving the rotor of a first electric generator 9a, and the second turbine rotor 10b is for driving the rotor of a second electric generator 9b of the capture device. The first turbine rotor 10a and the first generator 9a constitute a first capture and electrical-energy-production unit and the second turbine rotor 10b and the second generator 9b constitute a second capture and electrical-energy-production unit of the capture device 1.

The bearings 7a and 7b for the rotary mounting of the hubs 8a and 8b have an approximately horizontal common axis 11 which is pointed in the overall direction in which the wind blows while the wind turbine is in operation. The wind has been depicted in the conventional way by arrows 13 upstream of the first turbine rotor 10a and 13' upstream of the second turbine rotor 10b.

In general, the turbine rotors 10a and 10b and the generators 9a and 9b constituting the capture units are mounted on the nacelle 3 in symmetric arrangements with respect to the vertical axis 5 of the mast 2.

The first turbine rotor 10a is placed facing into the wind depicted by the arrows 13 and the second turbine rotor 10a is placed on the lee side of the residual wind which has passed through the first turbine rotor, this residual wind being depicted by the arrows 13', the two turbine rotors 10a and 10a being aligned in the direction of the wind. The turbine rotors 10a and 10b are mounted so that they can rotate on the nacelle 3, entirely independently of one another, there being no means of mechanical connection between the two turbine rotors.

Each of the turbine rotors 10a and 10b consists of the corresponding hub 8a or 8b and of a set of respective blades 12a or 12b fixed rigidly in approximately radial directions to their hub 8a or 8b.

Each of the rotors may, for example, have two or three radial blades set 180° or 120° apart about the axis 11 of rotation of the hubs.

As visible in the central part of FIG. 1, the blades 12a and 12b have a profiled shape in cross section on a plane parallel to the axis of rotation of the turbine rotor.

The profiles of the blades 12a and 12b are the reverse of each other, which means that the wind causes the two turbine rotors to rotate in opposite directions. The two turbine rotors are therefore said to be contra-rotatory. The circular arrows 14 and 14' have been used to, depict the direction of rotation of the first turbine rotor 10a and of the second turbine rotor 10b, respectively.

Each of the electric generators 9a and 9b is produced in discoid form and comprises two rotors each of which rotates as one with the corresponding turbine rotor, and a double stator fixed to part of the nacelle 3.

Figure 2:
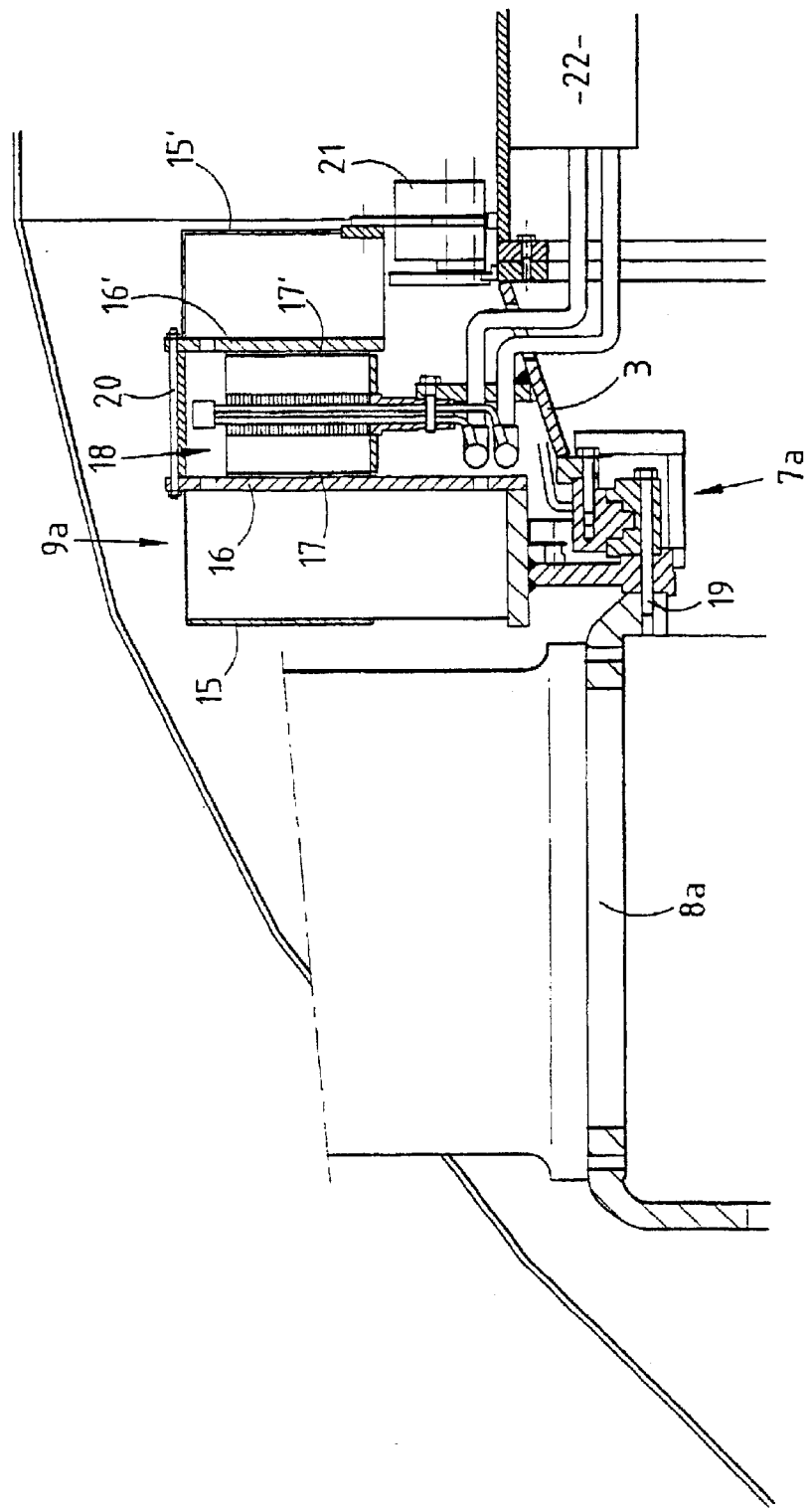
FIG. 2 is an enlargement of part of FIG. 1, showing the electric generator of one of the capture units.

The two electric generators 9a and 9b, which are arranged symmetrically with respect to the axis 5, are produced in the same way which means that only the generator 9a of the first capture unit will be described in detail, with reference to FIG. 2.

The generator 9a, produced in discoid form, comprise two stators 15 and 15' of annular overall shape and comprising a part 16 or 16' in the form of a flat disc carrying, on its external face facing toward the stator, permanent magnets 17 or 17'. The discs 16 and 16' of the rotors 15 and 15' are secured to an annular hollow rotor body containing a laminated core consisting of a stack of laminations. The rotor 15 is fixed directly on the hub 8a by screws 19 which also fix the rotating internal part of the bearing 7a of the rotary mounting of the hub 8a and of the turbine rotor 10a.

The fixed outer part of the bearing 7a is secured to a part of the nacelle 3 to which is also fixed the stator 18 of annular overall shape with two flat discoid faces placed facing flat discoid faces of the stators 16 and 16' carrying the permanent magnets 17 and 17'.

The two rotors 15 and 15' are secured together by screws which clamp the discs 16 and 16' of the stators against a multi-part peripheral ring 20. The rotors are held in the axial direction by thrust bearings associated with the rotary bearing 7a and by a double thrust bearing 21 which holds the rotor in the axial direction and in two opposite directions.

The stator 18 has two parts facing, respectively, the rotor 16 and the rotor 16' and each of which consists of a laminated core in which are mounted coils facing the permanent magnets 17 and 17' of the rotors 16 and 16'.

The coils of the stator 20 are connected by electrical conductors to means of connecting the generator to a user line for the current produced. The stator coils are also connected to a box 22 secured to the nacelle 3 and containing power electronics for controlling the electric generator and regulating the rotational speed of the rotors 15 and 15'.

Of course, the second electric generator 9b is connected in the same way as the first electric generator to power electronics which may be located in the box 22, so that the first and second electric generators can be controlled entirely independently and so that the speed of the rotor of the first generator and of the first turbine rotor and of the rotor of the second generator and of the second turbine rotor can be regulated entirely independently.

The method for regulating the capture device according to the invention by regulating the speed of the rotors of the generators and of the turbine rotors of the two capture units of the device according to the invention will now be described with reference to FIG. 3 and FIG. 4.

Figure 3:
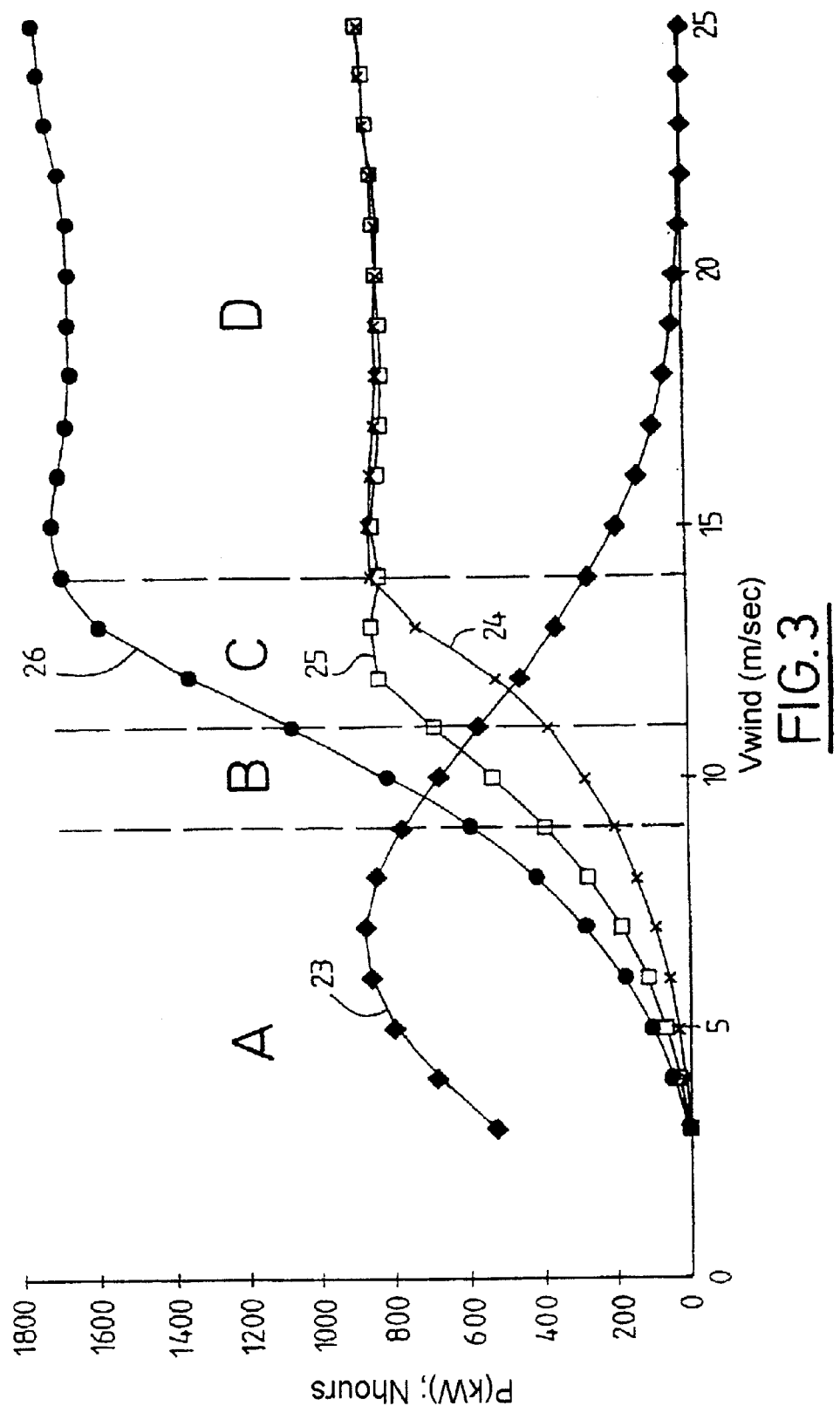
FIG. 3 is a diagram showing, as a function of wind speed, the power supplied by each of the capture units and the total power supplied by the device, and the distribution over time of the wind speeds over a reference period of one year.

FIG. 3 represents, in the form of a curve 23, the number of hours (along the ordinates axis) in a reference period of one year, for which the wind to which the capture device according to the invention is subjected has a speed which is indicated along the abscissas axis. In reality, each of the points giving a number of hours with a certain wind speed corresponds to a range of speeds of an amplitude of one meter/second.

The curve 23 represents the distribution of wind speeds over the course of the year at the site at which the wind turbine is erected. The curve 23 has an initial point to the left in FIG. 3, corresponding to a speed of the order of 3 m/second which is the wind speed needed to start the wind turbine. The power supplied respectively by the first capture unit and by the second capture unit of the device according to the invention, as a function of wind speed, is also given in FIG. 3, in the form of the curves 24 and 25.

Finally, the curve 26 represents the total power supplied by the device, that is to say the sum of the powers supplied by the first and by the second capture units of the device.

As visible in FIG. 3, the two capture units start up at a wind speed of the order of 3 m/s and the turbine rotors of the capture units rotate at a speed which increases as the wind speed increases. Correspondingly, increasing amounts of power are produced by each of the capture units.

In a first zone A, the speed of the rotary part of the first capture unit facing into the wind increases until it reaches a speed that corresponds to the onset of regulation by aerodynamically stalling the rotary part of the first capture unit. The speed at which aerodynamic stall begins is around 9 m/second. This stall may be commanded or obtained automatically when the wind speed reaches the limit determined by the characteristics of the first capture unit.

Under the operating conditions in zone A, the first capture unit works at its maximum efficiency, the coefficient of power CP or Betz coefficient being at a maximum. The coefficient of power or Betz coefficient is defined as the ratio of energy recovered to maximum recoverable energy which represents about 60% of the kinetic energy of the wind.

Because the first capture unit is operating at maximum efficiency, the second capture unit has only a fraction of the recoverable kinetic energy available to drive it, this fraction representing for example from 50 to 80% of the energy absorbed by the first capture unit.

FIG. 3 represents the scenario in which the second capture unit has only 50% of the energy captured by the first capture unit available to it. The rotational speed of the rotary part of the second capture unit is adapted to suit the wind speed so that this second capture unit works at maximum CP coefficient.

In zone A, the total recovered power is, in this instance, equal to one and a half times the power captured by the first capture unit. The gain in power due to the second capture unit is therefore, in this instance, about 50% in zone A.

After zone A, the graph of FIG. 3 represents a zone B ranging from the point of aerodynamic stall of the first capture unit (for a wind speed of the order of 9 m/second) up to the point of aerodynamic stalling of the second capture unit (for a wind speed of the order of 11 m/second).

In this zone B, the rotary part of the first capture unit begins to experience aerodynamic stall and the stronger the wind becomes, the more the rotary part of the first capture unit experiences stall; what this means is that the residual kinetic energy that can be recovered by the rotary part of the second capture unit increases up to the point at which the rotary part of the second capture unit stalls at a speed (for example 11 m/second) which is dependent upon the characteristics of the second capture unit. In zone B, the second capture unit is operating at maximum CP.

In the next zone, C, the two capture units are operating in conditions of increasing stall, the first capture unit reaching maximum stalling before the second capture unit which means that the gain in power contributed by the rotary part of the second capture unit progresses in zone C from 50%, for the speed at the onset of stall, to 100% for the wind speed (around about 14 m/second) at which the rotary parts of both capture units are experiencing aerodynamic stall.

Thereafter, up to the highest wind speeds (zone D), both capture units are making the same contribution to the total power supplied by the capture device.

It is therefore obvious that the speed regulation achieved independently on the rotary parts of each of the capture units makes it possible, for any wind speed, to optimize the capture device so that the power supplied by this device will be as high as possible, given the amount of wind energy that can be recovered.

The speeds of the rotary parts of the capture units are regulated by the power electronics associated with the electric generator of these capture units.

Figure 4:
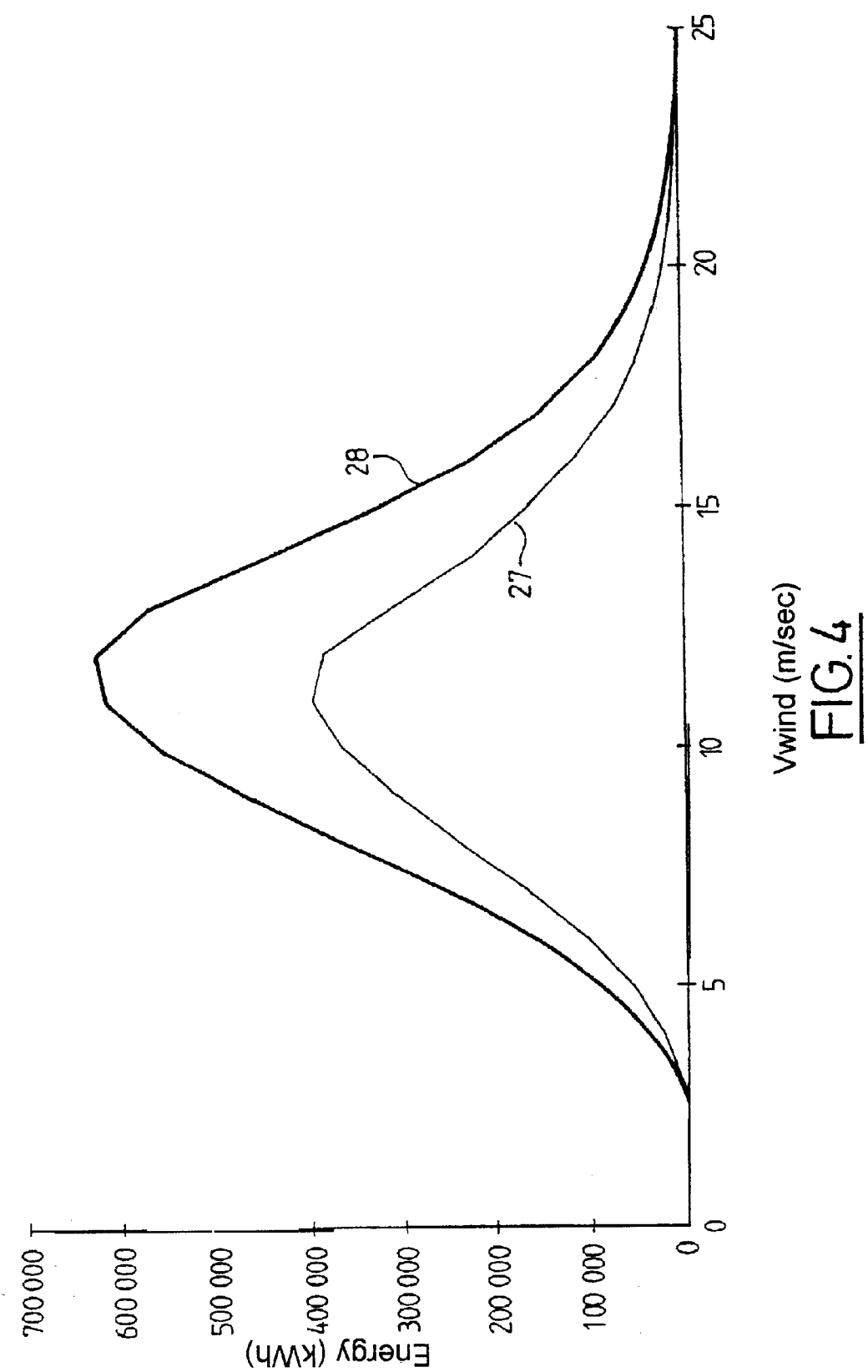
FIG. 4 is a diagram showing, as a function of wind speed, the annual energy production of the capture device according to the invention.

FIG. 4 represents, in the form of a curve 27, the energy produced in the reference period of one year by the first capture unit as a function of the wind speed and, in the form of a curve 28, the energy produced annually by the entire device consisting of the first and second capture units, as a function of wind speed.

The curves 27 and 28 are obtained from the curve 23 and the curves 24 and 26 respectively, by multiplying the powers supplied by the number of hours corresponding to that wind speed.

The use of a second capture unit mounted on the nacelle of the wind turbine after the first capture unit makes it possible to increase the energy recovery by about 60% to 70% compared with the use of a single capture unit having a rotary part of the same diameter and with the same aerodynamic characteristics as the rotary part of the capture unit used in addition.

Regulating the speed of the rotary parts of the capture units makes it possible to optimize the recovery of energy on each of the capture units and, in particular, to make the second capture unit operate in a way which is optimum for the recovery of the recoverable energy which is not captured by the first capture unit.

The device and the method according to the present invention therefore make it possible to increase the installed power of a device for capturing wind energy by using a first and a second capture unit one after the other and to increase the energy produced over a reference period by regulating the first and second capture units.

The device according to the invention also is very compact in spite of the use of two capture units arranged one after the other. This compactness is obtained by virtue of the use of discoid electric generators.

Furthermore, the capture device according to the invention has no complex and fragile mechanical parts and the speed of the rotary parts of the capture units is regulated entirely by electronic means.

The invention is not strictly limited to the embodiment which has been described.

Thus, the turbine rotors and the electric generators of the capture units may be produced in a different form.

The turbine rotors of the capture units may have any number of blades, the length of which may be chosen from a vast range.

The electric generator may have one single rotor and one single stator or, on the other hand, one or more units themselves comprising one or more rotors and one or more stators.

The power electronics for controlling the electric generators and regulating the speed of rotors associated with the turbine rotors may be produced by any means known to those skilled in the art.

The invention applies to the manufacture and operation of any wind turbine used for producing electrical current.

What is claimed is:

1. A device for capturing wind energy to produce electrical energy, comprising:

a vertical mast;

a nacelle mounted rotatably about a vertical axis on the upper part of the mast;

a first capture unit including a first turbine rotor having a first hub and at least two first blades fixed to the first hub in generally radial directions, said first hub being mounted rotatably about a generally horizontal axis on the nacelle;

a second capture unit including a second turbine rotor having a second hub and at least two second blades fixed to the second hub in generally radial directions, said second hub being mounted rotatably about the generally horizontal axis about which said first hub is rotatably mounted so that said first turbine rotor and said second turbine rotor rotate independently of each other and said blades of said second rotor are oriented such that said first rotor and said second rotor counter rotate;

a first electric generator of discoid shape including a first rotor having one disc-shaped rotor part fixed to the first turbine rotor and a first stator having one disc-shaped stator part fixed on the nacelle so as to face the rotor part of the first rotor;

a second electric generator of discoid shape including a second rotor having one disc-shaped rotor part fixed to the second turbine rotor and a second stator having one disc-shaped stator part fixed on the nacelle so as to face the rotor part of the second rotor; and power electronic means for controlling the electric currents produced by said first and said second stators of said first and said second electric generators independently of each other thus regulating the rotational speed of said first turbine rotor and said second turbine rotor.

2. The wind energy capturing device of claim 1 wherein the power electronic means regulates the rotational speed of the first and second rotors independently of each other at an optimum value depending on the wind speed for optimizing the energy and power produced by the device.

3. The wind energy capturing device of claim 2 wherein the power electronic means operates so that, in a first zone of operation A of a plot of power supplied by said first and said second capture units as a function of the wind speed, for wind speeds ranging from the capture unit start-up speed to a speed at which the rotating part of the first capture unit is aerodynamically stalled, the first capture unit and the second capture unit are operated under conditions of maximum efficiency, and the speed of the rotating parts of the capture units is then regulated in order to regulate the aerodynamic stall of the rotating part of the first capture unit and cause the residual energy to be recovered by the rotating part of the second capture unit, so that the increase in power and energy produced by the second capture unit gradually reaches the value of the power and of the energy recovered by the first capture unit, for increasing wind speed.

4. The wind energy capturing device of claim 3 wherein the power electronic means operates so that the increase in power and energy produced by the second capture unit changes progressively, after the onset of stall in the rotating part of the first capture unit, from 50% to 100% of the power and energy produced by the first capture unit.

* * * * *